June 20, 1961
L. R. CLARK
2,989,063
PNEUMATIC TRANSMITTER
Filed June 18, 1958
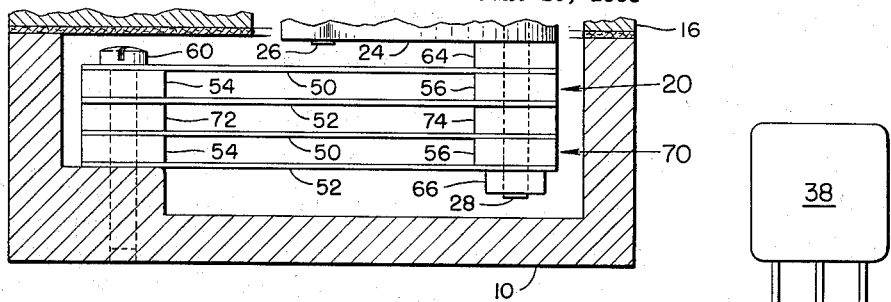
FIG. 3
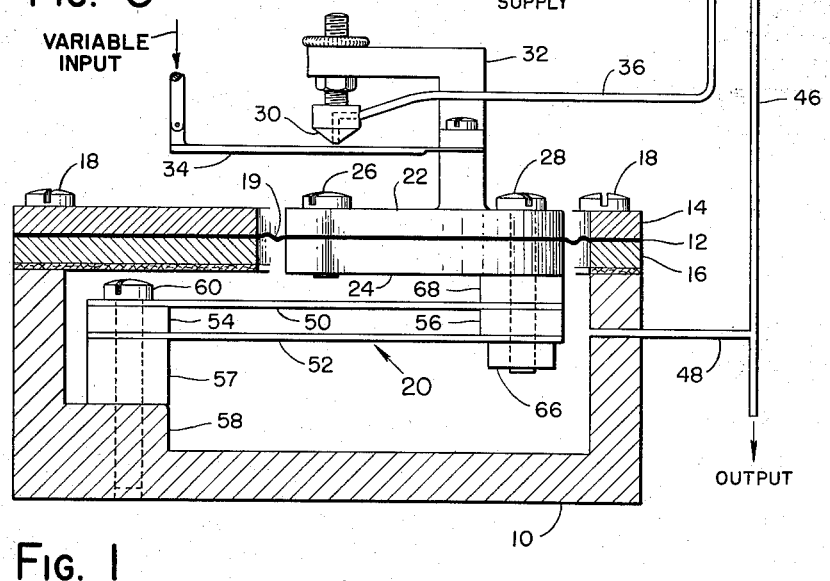
FIG. 1
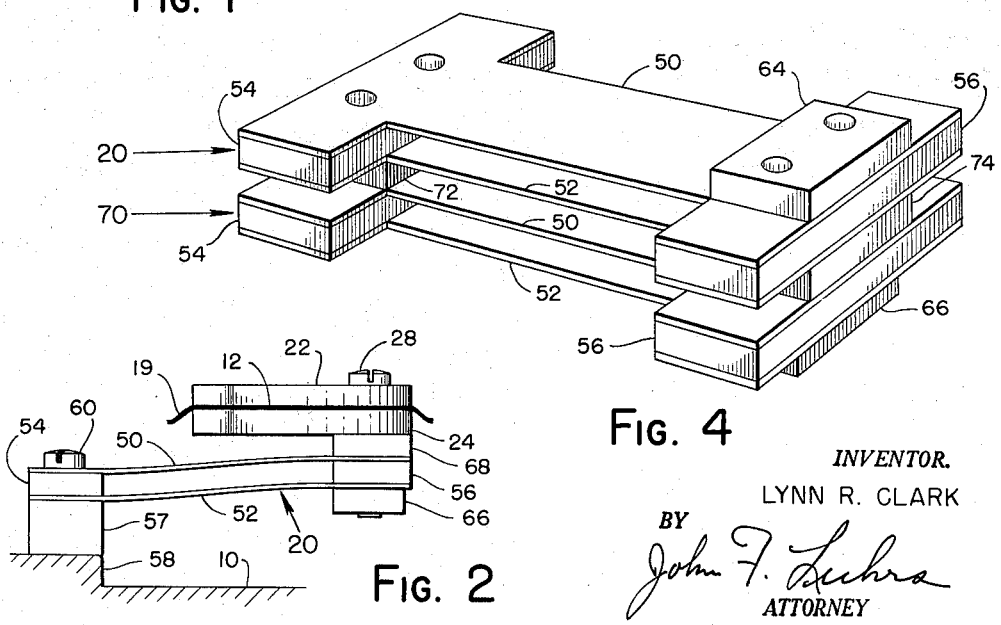
FIG. 2
FIG. 4
INVENTOR.
LYNN R. CLARK
BY
John F. Luchra
ATTORNEY United States Patent Office 2,989,063
Patented June 20, 1961

2,989,063
PNEUMATIC TRANSMITTER
Lynn R. Clark, Mentor, Ohio, assignor to Bailey Meter Company, a corporation of Delaware
Filed June 18, 1958, Ser. No. 742,932
9 Claims. (Cl. 137—85)

This invention relates to pneumatic control apparatus and more particularly to a pneumatic transmitter and biasing means therefor.

While not limited to, the invention finds particular utility when embodied as a pneumatic transmitter. Such transmitting devices usually are arranged to operate on a force balance or motion balance principle employing a pressure sensitive element as a means for producing the balancing force or motion.

In a typical motion balance transmitting device a baffle is positioned in flow controlling relationship with a nozzle connected to a source of pneumatic pressure and a pneumatic amplifier or relay. When the baffle is displaced relative to the nozzle in response to a change in the magnitude of a variable, it will vary the flow from the nozzle and the pressure in the relay to produce an output pneumatic pressure. A pressure sensitive element responsive to the output pressure and operative against the force of a biasing means will effect follow-up movement of the nozzle until the original spacing between the nozzle and baffle are restored. Thus, the magnitude of the output signal is dependent upon the force necessary to effect follow-up movement of the nozzle to restore the original spacing and thus is dependent on the biasing force of the biasing means.

It will be apparent that if the biasing force is not linear with deflection of the pressure sensitive element, calibration of the device will be extremely difficult, and the system will in most cases fail to provide accurate indication of the variable. In the past such an error has existed in pneumatic transmitting devices due to the use of a coil spring or leaf spring as the biasing means. As is well known in the art, the deflection of a coil spring with application or removal of force therefrom is not linear, and thus the biasing force applied to the pressure sensitive element is not constant over the normal range of movement encountered. A single leaf spring, while having more linearity than the coil spring has been found impractical because it acts as a cantilever beam and the direction of the application of force to the pressure sensitive element will shift with deflection thereof, introducing a substantial error into the system.

It is therefore an object of this invention to produce a biasing means having a force which is substantially linear with deflection.

Another object of this invention is to provide a biasing means having a high spring rate but which occupies minimum space.

Still another object of the invention is to provide a biasing means comprising two or more leaf springs connected in a pantograph construction to prevent cantilever deflection of the individual leaf springs and to produce a high spring rate linear with deflection.

Another object of the invention is to provide a pneumatic transmitter having a higher degree of accuracy than prior devices.

Another object of the invention is to provide a transmitting apparatus which can easily be converted to different output pressure ranges.

Other objects and advantages will become apparent from the following description taken in connection with the accompanying drawings wherein:

FIG. 1 is a schematic illustration partly in section of a transmitter embodying this invention;

FIG. 2 is a view of a portion of the transmitter illustrating the operation thereof;

FIG. 3 is a sectional view of a portion of the transmitter illustrating another embodiment of the invention;

FIG. 4 is a perspective view of a portion of the transmitter illustrated in FIG. 3.

Referring to FIG. 1 of the drawing, the pneumatic transmitter embodying this invention comprises a casing 10 having a pressure sensitive element 12 mounted therein which in this case takes the form of a flexible diaphragm. A pair of plates 14, 16 are fixed to the upper end of the casing 10 by screws 18, the diaphragm 12 being clamped between said plates.

The plates 14, 16 are provided with aligned circular openings respectively to subject a circular portion 19 of the diaphragm 12 to the fluid pressure within the casing 10. A biasing means indicated generally by the reference numeral 20 is positioned in the casing 10 to apply a biasing force to the circular portion of the diaphragm 12 tending to deflect the same toward the bottom wall of the casing 10. Thus, the force of the biasing means 20 will act on the diaphragm in opposition to the pressure within the casing 10.

A pair of circular plates 22, 24 of smaller diameter than the opening in the plates 14, 16 engage opposite sides of the diaphragm 12 and are clamped together by screws to reinforce the center portion of the diaphragm. One pair of screws 26 are threaded in the plates 22, 24 while a second pair 28 extend through plates 22, 24 and serve to connect the end of the biasing means 20 to the under side of the plate 24 as will be described in more detail hereinafter.

The diaphragm 12 is sensitive to pressure within the casing 10 and forms part of a motion balance transmitting device, the movement of the diaphragm in response to a pressure change in the casing 10 establishing the balancing motion in the system. More particularly, the upper plate 22 provides support for a nozzle 30 which is carried on one arm of a bracket 32. A flexible baffle 34 is mounted in flow controlling relationship with the nozzle 30 having one end thereof fixed to the center of the bracket 32 and the other end thereof 34 movable in response to a change in the magnitude of the variable.

The nozzle 30 is connected by conduit 36 to a pneumatic amplifier or relay 38 which may take the form of the amplifier disclosed and claimed in Patent No. 2,737,-963 to Gorrie et al. As described in the Gorrie et al. patent, the amplifier 38 is supplied with air under pressure from a suitable source and is provided with a pressure sensitive diaphragm operative in response to a change in the pressure in conduit 36 to vary the position of a valve means and the output pressure in conduit 46. The output pressure in conduit 46 is applied to the interior of the casing 10 by means of a conduit 48 to apply a force to the diaphragm in opposition to the force of the biasing means 20.

Assuming a change in the variable to effect upward deflection of the baffle 34, the spacing between the nozzle 30 and baffle 34 will decrease causing an increase in pressure within the conduit 36. The amplifier 38 sensitive to the pressure increase in conduit 36 will establish an increased output pressure in conduit 46 and within the housing 10. It will be apparent that this output pressure will build up until the force on the circular area 19 of the diaphragm 12 is sufficient to displace upwardly the assembly of the diaphragm plates, bracket 32, and nozzle 30 against the biasing force of the biasing means 20 to a position wherein the original spacing between the nozzle and baffle is restored. When this position is reached, the system will come to rest and the output pressure will remain constant at the new value until the spacing between the nozzle and baffle is again varied.

One particular feature of the transmitting apparatus is the fact that the baffle 34 and nozzle 30 are mounted on a common support 32 carried by the diaphragm 12 thus eliminating the usual separate supports for these parts. As will be apparent from FIG. 1, the vertical position of the left end of the baffle 34 is determined by the magnitude of the variable while the vertical position of the right end of the baffle 34 is determined by the position of the support 32. During a change in the variable, the support 32 is stationary until it is actuated by the diaphragm 12. Therefore, the baffle 34 will pivot about its right end as viewed in FIG. 1 and move relative to the nozzle 30. When the diaphragm becomes operative to balance the motion of the baffle 34, movement of the bracket 32 will move both the nozzle and baffle, but in this case the left end of the baffle 34 will remain stationary and therefore upward movement of the bracket 32 will effect angular movement of the baffle about its left end to establish movement thereof relative to the nozzle 30. Thus, it will be apparent that the particular method of supporting the nozzle 30 and baffle 34 results in an efficient inexpensive unit.

Referring now to the construction and operation of the biasing means 20, it is to be noted that the biasing force determines the magnitude of the output pressure since the biasing force is balanced by the pressure in the housing 10. The biasing force applied to the diaphragm 12 will increase with upward deflection of the diaphragm and thus the position of the diaphragm and magnitude of the output pressure at any position thereof will depend on the biasing force of the means 20.

It will be apparent that if the biasing force applied to the diaphragm 12 is not linear with deflection thereof there will not be a linear relationship between the magnitude of the variable and the output pressure developed in the conduit 46. In addition, if the biasing force is not applied in a direction normal to the plates 22, 24, tilting movement of the diaphragm plates and support 32 will occur also resulting in a non-linear relationship between the variable and the output pressure.

Referring now to FIGS. 1, 2 and 4, the biasing means 20 comprises a spring assembly of generally pantograph construction consisting of two generally I-shaped leaf springs 50, 52 positioned in a parallel overlying relationship within the casing 10. In the structure illustrated in FIG. 1, the two springs 50, 52 are spaced apart by a pair of spacers 54, 56 which separate the end portions of the springs 50, 52. The springs 50, 52 are fixed to opposite sides of the spacers 54, 56 as for example by welding to complete the assembly.

One end of the spring assembly 20 is seated on a spacer 57 (FIG. 1) mounted on a fixed support provided by a shoulder 58 of the casing 10 and clamped thereto by means of a pair of screws 60 extending through the springs 50, 52 and spacers 54, 57 to be threaded in the shoulder 58. The other end of the spring assembly is similarly fixed to the diaphragm plates 22, 24 by means of the two screws 28 which extend through the plates and end of the spring assembly to be threaded in a clamp block 66. A spacer 68 is clamped between the spring 50 and lower plate 24.

The leaf springs 50, 52 forming the biasing means 20 are provided with an inherent bias toward a straight or flat configuration wherein the biasing force of the assembly is zero. The diaphragm 12 and spring assembly are arranged whereby the biasing force and output pressure are minimum at the lowermost position of the diaphragm, but maximum at its uppermost position.

Modern pneumatic control systems generally operate in a 3–15 p.s.i. range of control pressures or a 3–27 p.s.i. range depending on the particular application of the system. The spring assembly illustrated in FIG. 1 is constructed so as to produce an output pressure in the conduit 46 in the range of 3–15 p.s.i. Thus, in the lowermost position of the diaphragm 12 the output pressure in conduit 46 will be 3 p.s.i. while in the uppermost position the output pressure will be 15 p.s.i. As will later be described, the apparatus is easily converted for use in a 3–27 p.s.i. system by the addition of another spring assembly.

Referring now to the operation of the biasing means 20, it will be apparent that if only a single leaf spring were provided, the bending of the spring with deflection of the diaphragm 12 would be identical to that of any cantilever beam having a load applied to the free end thereof. Accordingly, the end portion of the single spring would necessarily become deflected angularly relative to the plane of the spring in the relaxed position thereof. As a result, tilting or angular displacement of the plates 22, 24 and support 32 would occur introducing a substantial error into the system.

The particular pantograph construction of the spring assembly 20 eliminates the undesired effects of a single leaf spring or cantilever beam. When the end of the spring assembly 20 is deflected by upward movement of the diaphragm 12, the end portion of the upper spring 50 remains parallel to the bottom wall of the casing 10, preventing any angular displacement of the plates 22, 24 and diaphragm 12.

FIG. 2 illustrates schematically the bending action of the spring assembly 20 which takes place upon upward deflection of the diaphragm 12 and plates 22, 24. Since the two springs 50, 52 are connected in a pantograph fashion, cantilever bending of the assembly is prevented. The assembly must necessarily assume a configuration during bending thereof wherein the lengths of the two springs are equal, and as illustrated in FIG. 2, the assembly becomes reversely curved with the end portion of the assembly remaining substantially parallel to the bottom wall of the casing 10.

It will be apparent that as the diaphragm 12 is deflected upward by an increase in pressure within the chamber of the casing 10, the spring assembly 20 will bend in the manner shown in FIG. 2 with the end portion thereof remaining parallel to the bottom wall of the casing. Since the diaphragm 12 and plates 22, 24 are fixed to the end portion of the spring assembly 20, these parts also remain parallel to the bottom wall of the casing and are restrained against any angular movement by the spring assembly 20. Thus, the spring assembly in addition to always establishing a biasing force in a direction normal to the plane of the plates, 22, 24, also prevents any angular displacement or tilting of the plates.

As the diaphragm 12 and spring assembly 20 are deflected upward, the end portion of the spring assembly will be displaced slightly in a lateral direction due to the above described bending action. A similar deflection of diaphragm 12 and plates 22, 24 will occur since these parts are carried on the end portion of the spring assembly. This lateral displacement however, does not affect the operation of the system since the circular area of the diaphragm 12 subjected to the pressure within the casing 10 remains constant. Any lateral displacement of the plates 22, 24 will be taken up in the slack of the diaphragm 12.

Through tests, I have found that the biasing force produced by the pantograph spring assembly is substantially linear with deflection over a wide range of output pressures. Thus, the transmitting apparatus is capable of a high degree of accuracy and may be properly classed as a precision instrument.

FIGS. 3 and 4 of the drawings illustrate the transmitting apparatus converted for operation in a system having a 3–27 p.s.i. range. This conversion is accomplished through the provision of an additional spring assembly or biasing means 70 of construction identical to the spring assembly 20. The spaced 57 illustrated in FIG. 1 is omitted and one end of the assembly 70 is clamped between the end of the spring assembly 20 and the shoulder 57. The other end of the spring assembly 70 is clamped between the clamping block 66 and the other end of the assembly 20. A pair of spacers 72, 74 are positioned between the two spring assemblies to provide a unit having four spaced leaf springs.

The spacer 57 illustrated in FIG. 1 corresponds in size to the space required for the assembly 70 and spacer 72, thus, the conversion can be accomplished without affecting the position of the spring assembly 20 and plates 22, 24. This is an important feature inasmuch as the conversion can be accomplished in a small amount of time by unskilled service personnel.

Another advantage of the biasing means is the fact that a 3–15 p.s.i. transmitting device may be purchased with an additional spring assembly. The purchaser can either retain the additional assembly as a spare part or use it to convert the transmitting device to operation in a 3–27 p.s.i. system. Thus, the construction disclosed also provides a transmitting device of considerable flexibility.

While two embodiments of the invention have been herein shown and described, it will be apparent to those skilled in the art that many changes may be made in the construction and arrangement of parts without departing from the scope of the invention as defined in the appended claims.

What I claim as new and desire to secure by Letters Patent of the United States is:

1. A pneumatic transmitting apparatus, comprising a casing, a nozzle and baffle fluid pressure couple having a predetermined spacing therebetween mounted on said casing and operative to undergo relative movement in response to a change in a variable to vary said spacing, a pneumatic amplifier operative to produce a pneumatic output pressure in response to said relative movement, yieldable means responsive to said output pressure mounted on said casing and movable to restore said spacing, and biasing means for applying a biasing force to said means to thereby determine the magnitude of said output pressure, said biasing means comprising an assembly of spring strips positioned in spaced parallel relationship, one end of said assembly being operatively connected to said pressure responsive means and the other end thereof being supported on said casing.

2. A pneumatic transmitting apparatus, comprising a nozzle and baffle fluid pressure couple having a predetermined spacing therebetween and operative to undergo relative movement in response to a change in a variable to vary said spacing, a pneumatic amplifier operative to produce a pneumatic output pressure responsive to said relative movement, yieldable means responsive to said output pressure movable to restore said spacing, and an assembly of spring strips positioned in spaced parallel relationship, the end portions of said spring strips being fixed together at each end of said assembly, one end of said assembly being operatively connected to said pressure responsive means and the other end thereof being fixed relative to said pressure responsive means.

3. A pneumatic transmitting apparatus as claimed in claim 2 wherein said spring assembly is constructed to produce an output pressure range of the transmitting apparatus in the order of 3–15 p.s.i.

4. A pneumatic transmitting apparatus as claimed in claim 3 wherein a second spring assembly is provided mounted in spaced parallel relationship with the first said assembly, the end portions of the two assemblies being fixed together, said second assembly being effective to change the output pressure range of the transmitting apparatus to 3–27 p.s.i.

5. A transmitting apparatus for producing a signal representative of the magnitude of a variable comprising, an element movable in response to a change in the variable to establish an output signal, biasing means having a force linear with deflection acting in opposition to said element to determine the magnitude of said output signal, said biasing means comprising an assembly of spaced parallel spring strips having their end portions fixed together at each end of said assembly, one end of said assembly being mounted on a fixed support and the other end thereof being operatively connected to said element.

6. A pneumatic transmitting apparatus, comprising a casing having a pressure sensitive diaphragm mounted therein, a bracket supported on one side of said diaphragm and extending exteriorly of said casing, a nozzle supported on said bracket, a flexible baffle positioned in flow controlling relationship with said nozzle and having one end fixed to said bracket and the other end thereof movable in response to a change in a variable, means including a pneumatic amplifier and source of pneumatic pressure for establishing a pneumatic output pressure in response to movement of said baffle relative to said nozzle, means for supplying said output pressure to the other side of said diaphragm for actuating said bracket to restore the spacing between said nozzle and baffle, and biasing means acting on said diaphragm in opposition to said output pressure having a biasing force which is linear with deflection of said diaphragm.

7. A pneumatic transmitting apparatus, comprising a casing having a pressure sensitive diaphragm mounted therein, a bracket supported on one side of said diaphragm and extending exteriorly of said casing, a nozzle supported on said bracket, a flexible baffle positioned in flow controlling relationship with said nozzle and having one end fixed to said bracket and the other end thereof movable in response to a change in the variable, means including a pneumatic amplifier and source of pneumatic pressure for establishing a pneumatic output pressure in response to movement of said baffle relative to said nozzle, means for supplying said output pressure to the other side of said diaphragm for actuating said bracket to restore the spacing between said nozzle and baffle, and biasing means acting on said diaphragm in opposition to said output pressure comprising an assembly of spaced parallel spring strips having their end portions fixed together at each end of said assembly, one end of said assembly being mounted on said casing and the other end thereof being operatively connected to said diaphragm.

8. A pneumatic transmitting apparatus as claimed in claim 7 wherein said spring assembly has a biasing force sufficient to produce an output pressure range of the transmitting apparatus in the order of 3–15 p.s.i.

9. A pneumatic transmitting apparatus as claimed in claim 8 wherein a second spring assembly identical to the first said assembly is mounted in spaced parallel relationship thereto, the end portions of the two assemblies being fixed together, said second assembly being effective to change the output pressure range of the apparatus to 3–27 p.s.i.

References Cited in the file of this patent
UNITED STATES PATENTS

| | | |
|---|---|---|
| 1,128,140 | House | Feb. 9, 1915 |
| 1,833,405 | Bock | Nov. 24, 1931 |
| 2,638,874 | Woodhull | May 19, 1953 |
| 2,800,136 | Bowditch | July 23, 1957 |
| 2,827,020 | Cook | Mar. 18, 1958 |